No. 607,388. N. R. WHITACRE. Patented July 12, 1898.
PRUNING SHEARS.
(Application filed Nov. 27, 1896.)
(No Model.)
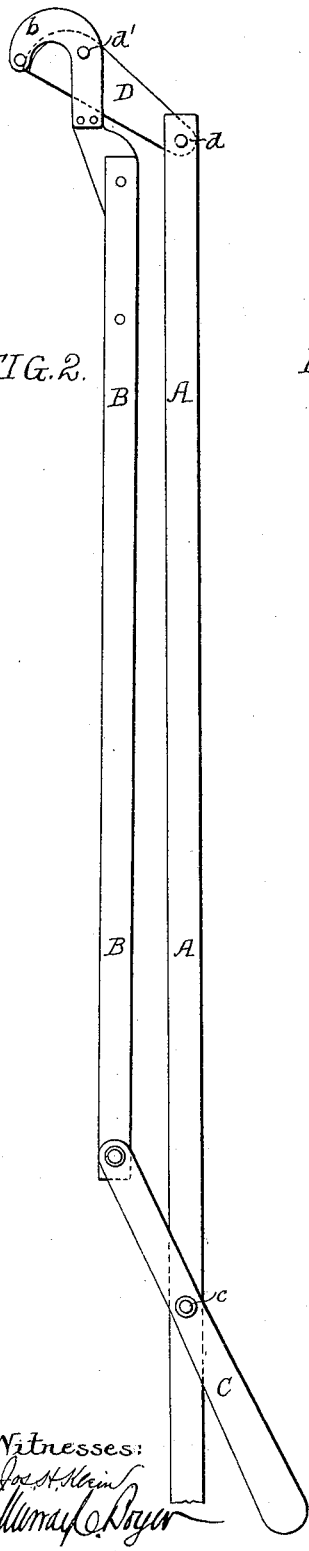
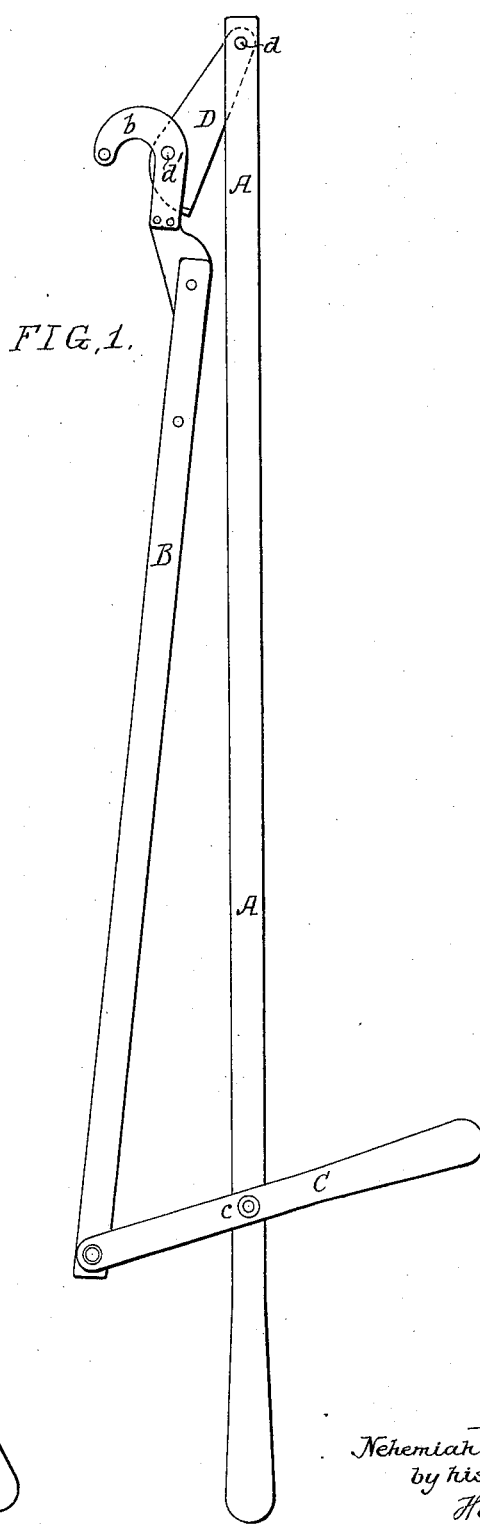
Witnesses:
Inventor:
Nehemiah Reece Whitacre,
by his Attorneys,
Howson & Howson

UNITED STATES PATENT OFFICE.

NEHEMIAH REECE WHITACRE, OF MARLTON, NEW JERSEY.

PRUNING-SHEARS.

SPECIFICATION forming part of Letters Patent No. 607,388, dated July 12, 1898.

Application filed November 27, 1896. Serial No. 613,672. (No model.)

*To all whom it may concern:*

Be it known that I, NEHEMIAH REECE WHITACRE, a citizen of the United States, and a resident of Marlton, Burlington county, New Jersey, have invented certain Improvements in Pruning-Shears, of which the following is a specification.

The object of my invention is to construct a pruning-hook in such a manner that it can be used to cut off branches of trees or shrubs by simply pulling down upon the main pole after the hook engages the limb, and the pulling action will operate the knife to cut the limb, and to so operate it, when the branches are not strong enough to withstand the pulling action, to cut them off by operating the lever to push the knife against the limb, thereby severing it.

Heretofore one form of pruning-knife has been made with a single pole and a sliding hook and pivoted knife, so that when the hook engages the limb a downward pull will cut the limb; but in every instance the limb has to withstand the strain of the pull, and while this is practicable in many cases still it is impracticable in other cases, especially in topping trees, as the pull will strain the branch and break it off below the hook rather than cut it. Consequently another style of hook has to be used. The other form of hook is that having a fixed hook at the end of a pole and a pivoted knife to which is secured a cord or wire, so that the branch is engaged by the hook and the cord or wire is given a sudden jerk, causing the knife to cut the limb. This style of hook is objectionable on account of the cord or wire and also on account of the power required to sever the branch. By my invention I couple the two forms of hook in one hook and push the knife to sever the limb in one case instead of pulling.

In the accompanying drawings, Figure 1 is a view of my improved pruning-hook with the knife in position to engage the limb. Fig. 2 is a view of the hook with the knife in position after cutting the limb.

A is the main pole, which can be of any length.

B is the push-pole, pivoted to a lever C, which in turn is pivoted at $c$ to the main pole A. This lever is provided with a suitable handle and is of such a length as to be readily grasped by the operator.

Secured to the end of the pole B is the hook $b$, preferably of the form shown in the drawings, made of two plates properly spaced and riveted together.

D is the knife, pivoted to the main pole A at $d$ and pivoted at $d'$ to the hook. The cutting portion of the knife passes between the two portions of the hook and severs the limb when either the main pole is drawn down or the pole B is forced up by actuating the lever.

It will be seen that I provide in one instrument two styles of hook. For quick work I use what is termed the "automatic" hook—that is, the one in which the hook simply engages the limb and a quick jerk or pull is exerted to sever the limb. Pruning can be accomplished very quickly by this instrument, and where it is required to top trees or to cut branches that will not withstand the strain of the pull then I simply hook onto the branch and push the pole B and its hook, which will draw the knife up and sever the limb, the limb being held between the edge of the knife and the hook, so that no strain whatever is placed upon the branch, and the most delicate branch can be cleanly cut by this instrument.

I claim as my invention—

The combination of the fixed pole A, a movable knife pivoted thereto, a movable pole B, a fixed hook carried by said pole B and pivoted to said knife, and a lever hung from the movable pole and pivotally mounted on the fixed pole, said lever adapted to bring the knife and hook into operative engagement with each other, substantially as described.

In testimony whereof I have signed my name to this specification in the presence of two subscribing witnesses.

NEHEMIAH REECE WHITACRE.

Witnesses:
MURRAY C. BOYER,
JOS. H. KLEIN.